US008799376B2

(12) United States Patent
Shiga et al.

(10) Patent No.: US 8,799,376 B2
(45) Date of Patent: Aug. 5, 2014

(54) METHOD, COMPUTER PROGRAM, AND DEVICE FOR PROCESSING E-MAIL ADDRESSED TO MULTIPLE DESTINATION ADDRESSES

(75) Inventors: Katsuyuki Shiga, Kanagawa (JP); Takeyuki Shimura, Kanagawa (JP); Masami Tada, Kanagawa (JP); Yuhichi Takahashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/946,931

(22) Filed: Nov. 16, 2010

(65) Prior Publication Data

US 2011/0125857 A1    May 26, 2011

(30) Foreign Application Priority Data

Nov. 26, 2009   (JP) ................. 2009-269119

(51) Int. Cl.
G06F 15/16 (2006.01)
(52) U.S. Cl.
USPC ........... 709/206; 709/203; 709/204; 709/205; 709/207
(58) Field of Classification Search
USPC ................................ 709/203–207
See application file for complete search history.

(56) References Cited

U.S. PATENT DOCUMENTS

| 2006/0034191 A1* | 2/2006 | Sahinoglu et al. | 370/254 |
|---|---|---|---|
| 2006/0253537 A1* | 11/2006 | Thomas | 709/206 |
| 2007/0011257 A1* | 1/2007 | Jeong et al. | 709/206 |
| 2008/0005249 A1* | 1/2008 | Hart | 709/206 |
| 2008/0040330 A1* | 2/2008 | Yano | 707/3 |
| 2008/0071873 A1* | 3/2008 | Gross | 709/206 |
| 2008/0195717 A1* | 8/2008 | Brown | 709/207 |
| 2009/0037469 A1* | 2/2009 | Kirsch | 707/104.1 |
| 2009/0037543 A1* | 2/2009 | Callanan et al. | 709/206 |
| 2009/0157818 A1* | 6/2009 | Cook et al. | 709/206 |
| 2010/0008481 A1* | 1/2010 | Zakarian et al. | 379/93.03 |
| 2010/0042424 A1* | 2/2010 | Turakhia | 705/1 |
| 2010/0223338 A1* | 9/2010 | Hodes | 709/206 |
| 2011/0055230 A1* | 3/2011 | Castro et al. | 707/751 |

FOREIGN PATENT DOCUMENTS

| JP | 2002064564 | 2/2002 |
|---|---|---|
| JP | 2004272823 | 9/2004 |
| JP | 2006048698 | 2/2006 |
| JP | 2005-230468 | 2/2007 |
| JP | 2007047963 | 2/2007 |

\* cited by examiner

*Primary Examiner* — Backhean Tiv
*Assistant Examiner* — Weiwei Stiltner
(74) *Attorney, Agent, or Firm* — Schmeiser, Olsen & Watts LLP

(57) ABSTRACT

To allow a receiver of e-mail addressed to a plurality of destination addresses to readily specify a message of his/her interest included therein. A device for processing e-mail containing a plurality of destination addresses, contents corresponding respectively to the destination addresses, and display attributes for displaying the corresponding contents on a display device is provided. The e-mail processing device includes a unit for acquiring the degree of association between a first destination address, which is one of the plurality of destination addresses and at least one of the other destination addresses, and a unit for modifying the display attributes for the contents in accordance with the degree of association.

12 Claims, 18 Drawing Sheets

```
                                              1200

To:Takahashi@a.co.jp, Tanaka@a.co.jp,
       Suzuki@a.co.jp, Itoh@a.co.jp
    From:Tada@a.co.jp
    Subject: OX

DEAR TAKAHASHI: ~~ 620
    PLEASE DO OO. ~~ 622

DEAR TANAKA: ~~ 624
    PLEASE TAKE CARE OF XX. ~~ 625

DEAR SUZUKI: ~~ 626
    PLEASE DO △△. ~~ 627

DEAR ITOH: ~~ 628
    PLEASE SEND ☐☐. ~~ 629
```

To:Takahashi@a.co.jp, Tanaka@a.co.jp,
   Suzuki@a.co.jp, Itoh@a.co.jp
Subject: OX DEAR ALL: ~ 690
PLEASE DO ○○ IMMEDIATELY. ~ 692      — 696
                                      — 660

Suzuki@a.co.jp
DEAR SUZUKI: ~ 650
PLEASE DO △△. ~ 652

Tanaka@a.co.jp
DEAR TANAKA: ~ 654
PLEASE TAKE CARE OF XX. ~ 656

HERE IS REFERENCE INFORMATION.     — 697
□□ ~ 695                           694

To:Takahashi@a.co.jp, Tanaka@a.co.jp,
    Suzuki@a.co.jp, Itoh@a.co.jp
Subject: OX

DEAR ALL: ~690
PLEASE DO ○○. IMMEDIATELY. ~692

DEAR SUZUKI: ~650
PLEASE DO △△. ~652

DEAR TANAKA: ~654
PLEASE TAKE CARE OF XX. ~656

HERE IS REFERENCE INFORMATION.
□□□ ~695
                                    ~694

To:Takahashi@a.co.jp, Tanaka@a.co.jp, Suzuki@a.co.jp, Itoh@a.co.jp ~ 602

Subject: O× ~ 603

Itoh@a.co.jp
DEAR ITOH:
PLEASE DO ○○. ~ 1602

Tanaka@a.co.jp
DEAR TANAKA:
PLEASE TAKE CARE OF ××. ~ 1604

Suzuki@a.co.jp
DEAR SUZUKI:
PLEASE DO △△. ~ 1606

Itoh@a.co.jp, Takahashi@a.co.jp
DEAR ITOH AND TAKAHASHI:
PLEASE SEND □□. ~ 1608
~ 610

```
To:Takahashi@a.co.jp, Tanaka@a.co.jp,
   Suzuki@a.co.jp, Itoh@a.co.jp
From:Tada@a.co.jp
Subject: ○×

DEAR ITOH:
PLEASE DO ○○.  ~1602

DEAR ITOH AND TAKAHASHI:
PLEASE SEND □□.  ~1608

DEAR SUZUKI:
PLEASE DO △△.  ~1606

DEAR TANAKA:
PLEASE TAKE CARE OF ××.  ~1604
```

To:Itoh@a.co.jp, Yamamoto@a.co.jp,
    Nakamura@a.co.jp, Kobayashi@a.co.jp
From:IT Security
Subject: Compliance Testing Witnessing

DEAR DEPARTMENT HEADS:

PLEASE ADVISE EACH PERSON IN CHARGE OF
VERIFICATION TESTING.

| DEPARTMENT | PERSON IN CHARGE | PC |
|---|---|---|
| SA120 | Takahashi@a.co.jp | 8187-97A999M |
| SA120 | Suzuki@a.co.jp | 2064-880001 |
| SA150 | Satoh@a.co.jp | 2064-881234 |
| SA450 | Tanaka@a.co.jp | 6290-999999 |
| SA450 | Tada@a.co.jp | 8168-890012 |
| SA610 | Watanabe@a.co.jp | 2647-99M0001 |

To:Itoh@a.co.jp, Yamamoto@a.co.jp,
Nakamura@a.co.jp, Kobayashi@a.co.jp
From:IT Security
Subject: Compliance Testing Witnessing

DEAR DEPARTMENT HEADS:

PLEASE ADVISE EACH PERSON IN CHARGE OF VERIFICATION TESTING.

| DEPARTMENT | PERSON IN CHARGE | PC |
|---|---|---|
| SA450 | Tanaka@a.co.jp | 6290-999999 |
| SA450 | Tada@a.co.jp | 8168-890012 |
| SA120 | Takahashi@a.co.jp | 8187-97A999M |
| SA120 | Suzuki@a.co.jp | 2064-880001 |
| SA150 | Satoh@a.co.jp | 2064-881234 |
| SA610 | Watanabe@a.co.jp | 2647-99M0001 |

To:Tanaka@a.co.jp, Tada@a.co.jp
From:Nakamura@a.co.jp
Subject: Fw: Compliance Testing Witnessing

PLEASE TAKE CARE OF THIS.

To:Itoh@a.co.jp, Yamamoto@a.co.jp,
   Nakamura@a.co.jp, Kobayashi@a.co.jp
From:IT Security
Subject: Compliance Testing Witnessing

DEAR DEPARTMENT HEADS:

PLEASE ADVISE EACH PERSON IN CHARGE OF VERIFICATION TESTING.

| DEPARTMENT | PERSON IN CHARGE | PC |
|---|---|---|
| SA450 | Tada@a.co.jp | 8168-860012 |
| SA450 | Tanaka@a.co.jp | 6290-999999 |
| SA120 | Takahashi@a.co.jp | 8187-97A999M |
| SA120 | Suzuki@a.co.jp | 2064-880001 |
| SA150 | Satoh@a.co.jp | 2064-881234 |
| SA610 | Watanabe@a.co.jp | 2647-99M0001 |

To: Itoh@a.co.jp, Yamamoto@a.co.jp,
Nakamura@a.co.jp, Kobayashi@a.co.jp
From: IT Security
Subject: Compliance Testing Witnessing

DEAR DEPARTMENT HEADS:

PLEASE ADVISE EACH PERSON IN CHARGE OF VERIFICATION TESTING.

| DEPARTMENT | PERSON IN CHARGE | PC | DEPARTMENT HEAD |
|---|---|---|---|
| SA450 | Toda@a.co.jp | 8168-89M012 | Nakamura |
| SA450 | Tanaka@a.co.jp | 6290-94M999 | Nakamura |
| SA120 | Takahashi@a.co.jp | 8187-97A0M0M | Itoh |
| SA120 | Suzuki@a.co.jp | 2064-88M001 | Itoh |
| SA150 | Satoh@a.co.jp | 2064-881234 | Yamamoto |
| SA610 | Watanabe@a.co.jp | 2847-90M0D01 | Kobayashi |

2200

CONTENTS REARRANGEMENT

FIRST PRIORITY GIVEN TO: DEPARTMENT HEAD
SECOND PRIORITY GIVEN TO: PERSON IN CHARGE
THIRD PRIORITY GIVEN TO:
FOURTH PRIORITY GIVEN TO:

SEND   CANCEL

METHOD, COMPUTER PROGRAM, AND DEVICE FOR PROCESSING E-MAIL ADDRESSED TO MULTIPLE DESTINATION ADDRESSES

CROSS-REFERENCE TO RELATED APPLICATIONS

This application is a utility application claiming priority to co-pending Japanese Utility Application Serial No. 2009-269119 filed on Nov. 26, 2009 entitled "METHOD, COMPUTER PROGRAM, AND DEVICE FOR PROCESSING E-MAIL ADDRESSED TO MULTIPLE DESTINATION ADDRESSES," the entirety of which is incorporated by reference herein.

FIELD OF THE INVENTION

The present invention relates to a method, a computer program, and a device for processing e-mail, and more particularly, to a method, a computer program, and a device for modifying the contents of an e-mail addressed to a plurality of destination addresses in accordance with the individual destination addresses.

BACKGROUND

In business activities, e-mail is one of the most routinely used communication means. Generally, a user sends/receives several to some tens of e-mails, or even some hundreds of e-mails, on a daily basis. The user needs to quickly determine the degree of importance of each received e-mail for smooth progress of work. To scrutinize the contents of each of a great number of e-mails, however, takes considerable time and labor.

E-mail users are making great efforts to save such time and labor by skimming or skipping through the e-mail texts, or reading only the beginning parts thereof. Particularly for a user who receives broadcast e-mails, it is very difficult to determine the degree of importance of each received mail, because a broadcast e-mail contains a plurality of messages, which are addressed to different destinations and are arranged at random.

Japanese Patent Application Publication No. 2007-47963 discloses an e-mail system for broadcast, which allows a mail sender to designate an important part and a not-important part in a send mail for each of a plurality of mail receivers, so that each mail receiver can readily determine the important part in the received mail (Abstract). For example, in broadcasting an e-mail to a plurality of destinations, the mail sender can designate, for each destination, whether a predetermined item in the mail text is to be highlighted or made invisible in the mail sent to that destination.

BRIEF SUMMARY

In one aspect, the invention features a method for processing e-mail. The e-mail includes a plurality of destination addresses, a plurality of contents corresponding respectively to the destination addresses, and a plurality of display attributes for displaying the corresponding contents on a display device. The method comprises the steps of acquiring the degree of association between a first destination address, which is one of the plurality of destination addresses and at least one of the other destination addresses, and modifying the display attributes for the contents in accordance with the degree of association.

In another aspect, the invention features a computer program for processing e-mail. The e-mail includes a plurality of destination addresses, a plurality of contents corresponding respectively to the destination addresses, and a plurality of display attributes for displaying the corresponding contents on a display device. The computer program causes a computer to operate as a means for acquiring the degree of association between a first destination address, which is one of the plurality of destination addresses and at least one of the other destination addresses, and a means for modifying the display attributes for the contents in accordance with the degree of association.

In another aspect, the invention features a device for processing e-mail. The e-mail includes a plurality of destination addresses, a plurality of contents corresponding respectively to the destination addresses, and a plurality of display attributes for displaying the corresponding contents on a display device. The e-mail processing device comprises a means for acquiring the degree of association between a first destination address, which is one of the plurality of destination addresses and at least one of the other destination addresses, and a means for modifying the display attributes for the contents in accordance with the degree of association.

BRIEF DESCRIPTION OF THE SEVERAL VIEWS OF THE DRAWINGS

FIG. 12 is a schematic diagram of another screen displayed on the display device in the mail receiving unit.

FIG. 13 is a schematic diagram of a mail including a content addressed to all the addressees, which is displayed on the display device in the mail editing unit.

FIG. 14 is a schematic diagram of a mail including a content addressed to all the addressees, which is displayed on the display device in the mail receiving unit.

FIG. 16 is a schematic diagram of yet another mail, which is displayed on the display device in the mail editing unit.

FIG. 17 is a schematic diagram of a mail which corresponds to the mail shown in FIG. 16 and which is displayed on the display device in the mail receiving unit.

FIG. 18 is a schematic diagram of a mail including a table, which is displayed on the display device in the mail editing unit.

FIG. 19 is a schematic diagram of the mail including the table, which is displayed on the display device in the mail receiving unit.

FIG. 20 is a schematic diagram of a mail displayed on the display device in the mail receiving unit in the case where the mail shown in FIG. 19 is forwarded.

FIG. 21 is a schematic diagram of a mail including another table, which is displayed on the display device in the mail editing unit.

FIG. 22 is a schematic diagram of a priority setting menu, which is displayed on the display device in the mail editing unit.

DETAILED DESCRIPTION

Figure 1:
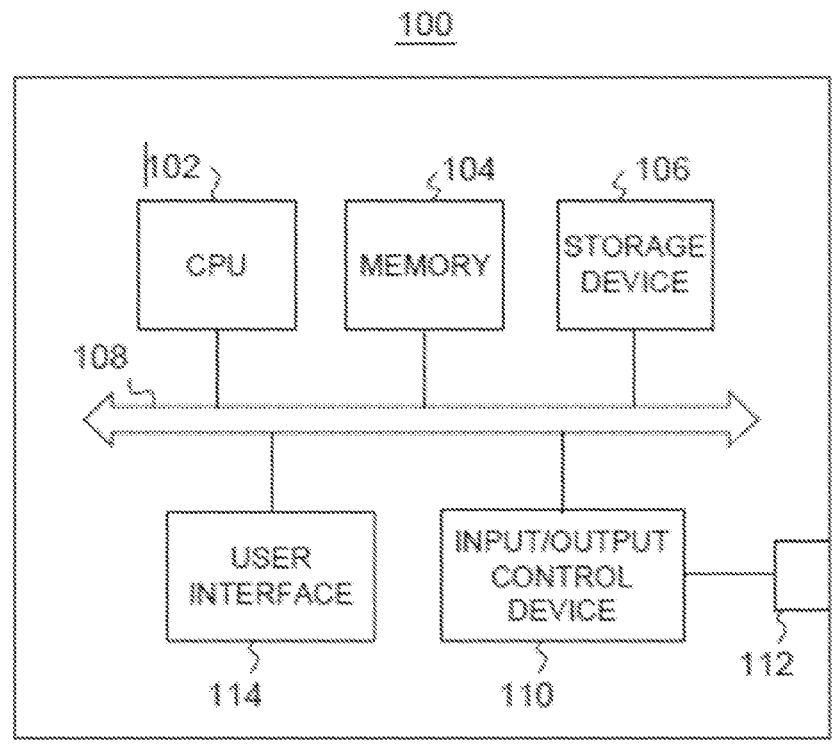
FIG. 1 is a hardware configuration diagram of each of a mail editing unit, a mail processing unit, a degree-of-association database, and a mail receiving unit.

Even with the conventional techniques described above, however, it will be difficult for each user who receives a broadcast e-mail, containing messages addressed to different users, to specify the message that the user is interested in. For example, it is not always true that only the message addressed to the user him/herself is of the user's interest. There may be a case where the message addressed to a co-worker, such as a colleague or a supervisor, is useful to the user as well.

The present invention provides a method for processing e-mail which contains a plurality of destination addresses, a plurality of contents corresponding respectively to the destination addresses, and a plurality of display attributes for displaying the corresponding contents on a display device. The processing method includes the steps of: acquiring the degree of association between a first destination address which is one of the plurality of destination addresses and at least one of the other destination addresses; and modifying the display attributes for the contents in accordance with the degree of association.

Here, the step of acquiring the degree of association may include the steps of accessing a destination address directory unit, the destination address directory unit storing a tree structure having the destination addresses as its nodes, and obtaining the degree of association on the basis of a distance from the first destination address to the other destination address.

More specifically, the tree structure may be configured on the basis of a report-to chain in which individual users corresponding respectively to the plurality of destination addresses are included.

For example, the display attribute may designate a location of the content on the display device, and the modifying step may include the step of modifying the display attributes for the content corresponding to the first destination address and for the contents corresponding respectively to the other destination addresses, in accordance with the degrees of association.

Furthermore, the modifying step may include the step of modifying the display attributes in such a manner that, of the contents corresponding respectively to the other destination addresses, the content corresponding to the destination address that is higher in the degree of association with the first destination address is located closer to the content corresponding to the first destination address.

Alternatively, the display attribute may be at least one of color, brightness, blinking, and decoration of the content on the display device.

A. Description of Terms

Firstly, terms used through the specification and the claims will be described.

(1) Unit: Any device that may be connected to a network. The units include, for example, a server computer, a portable computer, a display, a storage device, business equipment such as a facsimile machine and a copier, and a printer. The unit may be a virtual unit implemented by computer software. Irrespective of the typical examples described above, a unit does not necessarily have to be contained in one housing. A plurality of functions in a unit may be arranged in a physically distributed manner, as long as the functions work properly. For example, mailer software, which will be described later, generally implements the functions of a mail editing unit 402, but it may also implement the functions of a mail processing unit 200. Furthermore, a unit may refer to a program code or a group of program codes which resides in a computer memory.

(2) Content: Broadly refers to information to be processed by software. As used herein, the content may refer to e-mail text or a part thereof, although it is not restricted thereto. The contents may include, for example, a sentence, an image, a moving image file, an audio file, a table, and others. Herein, although not described explicitly, each content is stored in a field in a mail that is prepared for a corresponding addressee, and a mail processing unit and other units are each able to recognize the correspondence between the content and the destination address.

(3) Display attribute: Data which is referred to by a display device when a content is to be displayed on the display device. The data designates how the content is to be displayed. The display attributes include, for example, designations of color, brightness, and blinking of the content. Alternatively, the display attributes may be designations of decoration of the content, such as underline, box, and the like. As used herein, the display attributes also include the location on a display screen in which the content is to be displayed. The display attribute may be expressed in any form. It may be expressed in a bit-string format included in an e-mail. Alternatively, the arrangement order of contents in an e-mail may indicate the locations of the respective contents on a display screen.

(4) Degree of association: Refers to the degree of association between the destination addresses. The degrees of association reflect personal relationships between the users corresponding to the destination addresses in the real world. For example, assume that there are a user U1 having a destination address A, a user U2 having a destination address B, and a user U3 having a destination address C, that the users U1 and U2 are in the same department, and that the users U1 and U3 belong to different departments. In this case, it may be possible to define that the degree of association between the destination address A and the destination address B is higher than the degree of association between the destination address A and the destination address C. The degree of association may be expressed in any unit. It may be a dimensionless value. Any value will do as long as it can be used to compare the degree of association between a pair of destination addresses with the degree of association between another pair of destination addresses. The degree of association, however, is not limited thereto; it may be defined in accordance with the users' interests, transaction histories, or the like.

(5) Degree-of-association database: Refers to a database storing a tree structure in which a set of destination address, user's name, user's organization, and the like is set as a node. A user may access the database to search data. The tree structure may reflect an organization chart (also referred to as a "report-to chain") in a company, although it is not restricted thereto. Further, a user may follow the tree structure, in a known manner, to acquire the distance between any two nodes. Herein, the reciprocal of the distance represents the degree of association between the corresponding destination addresses.

(6) E-mail: Hereinafter, also simply referred to as "mail". An e-mail may be in any format. An e-mail generally includes a destination address and a text. In the present invention, the e-mail is preferably extended such that it includes data about the display attributes for contents included in the mail text and about the correspondences between the contents and the destination addresses of the mail.

B. Hardware Configuration

<Hardware Configuration of Each Unit>

FIG. 1 is a hardware configuration diagram of each of a mail editing unit 402, a mail processing unit 200, a degree-of-association database 300, and a mail receiving unit 406 according to the present invention. It should be noted that the components described below are only illustrative, and not all the components are indispensable to the present invention. Some components may be removed from or added to each unit in accordance with its functions. Each unit includes a CPU 102, a memory 104, a storage device 106, an input/output control device 110, a user interface 114, and a bus 108 which connects the components. The unit also includes a communication port 112.

The code for the computer program running on each unit may be stored in the storage device 106, or may be transferred into the memory 104 from an external device via the communication port 112 and the input/output control device 110. The computer program code may be executed by the CPU 102 as it is loaded to the memory 104, or the code may be executed by the CPU 102 in the state where it is stored in the storage device 106. In either case, the memory 104 may be used as a temporary storage memory as well. The user interface 114 is used for displaying operating states of the respective units, and for a user to input an operation mode.

The computer program code may be divided into a plurality of pieces, so as to be recorded across a plurality of storage media. Alternatively, parts of the divided code may each be recorded on a storage medium included in another external information processing device which is connected to each of the units via its communication port 112 and a communication network (not shown) connected thereto, and the code divided into the parts may be cooperatively executed by the CPUs 102 included in the units. Distributing the parts of the divided code to a plurality of devices so as to cause the devices to execute the same in a cooperative manner has been implemented, e.g., in a client-server system. Which device is caused to execute which part of the code for implementation of the functions may be selected as appropriate in designing a system, and the present invention encompasses any embodiments thereof.

Furthermore, each unit may be physically separated into functional block units, as will be described below, in which case hardware similar to that illustrated in FIG. 1 may be provided for each functional block, and the functional blocks may be configured to work cooperatively via their communication ports 112. An operation system running in each unit, although not indispensable, may be one of Windows XP®, AIX®, and Linux®, which each support a graphic user-interface multi-window environment as standard, or may be another operating system such as µiTRON®. The present invention is not restricted to any particular operating system environment.

C. System Configuration

<Mail Processing Unit 200>

Figure 2:
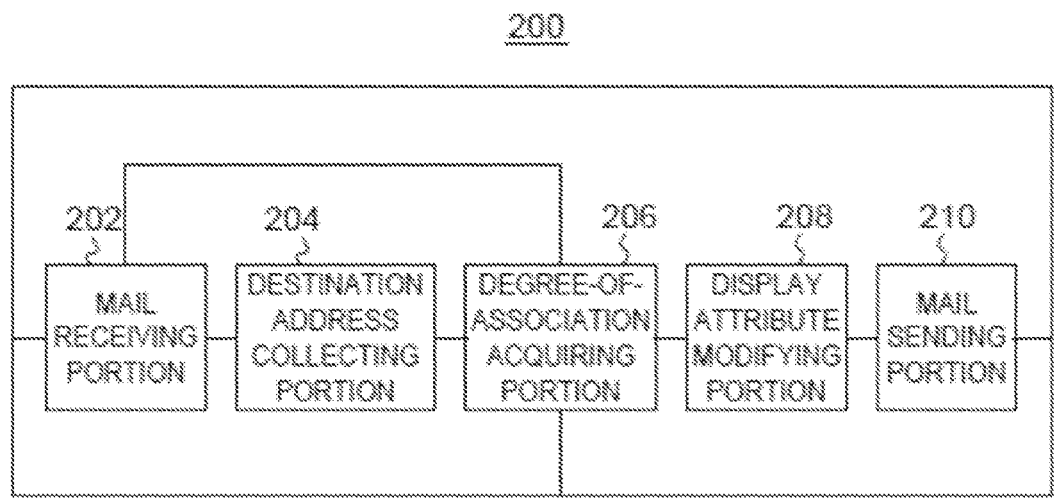
FIG. 2 is a functional block configuration diagram of the mail processing unit.

FIG. 2 is a functional block configuration diagram of the mail processing unit 200. The mail processing unit 200 includes a mail receiving portion 202, a destination address collecting portion 204, a degree-of-association acquiring portion 206, a display attribute modifying portion 208, and a mail sending portion 210. It is here assumed, for convenience of explanation, that a mail and other information are transmitted and received to and from the components, although it will be understood by a person skilled in the art that the information may be stored in the memory 104 and the like and its access right or pointer may be passed between the components.

The mail receiving portion 202 receives a mail from the mail editing unit 402, which will be described later. In the case of receiving the mail together with a mail sending instruction from the mail editing unit 402, the mail receiving portion 202 transmits the mail to the destination address collecting portion 204. In the case of receiving the mail together with a mail display instruction from the mail editing unit 402, the mail receiving portion 202 transmits the mail to the degree-of-association acquiring portion 206.

The destination address collecting portion 204 stores a received mail in the memory 104. Next, the destination address collecting portion 204 selects one of the destination addresses included in the received mail, and transmits the selected destination address and the mail to the degree-of-association acquiring portion 206. The destination address selected here becomes a destination of the mail. In the case where there are two or more destinations, the destination address collecting portion 204 repeats the above operations, and as a result, one mail is sent to each of the destination addresses.

Figure 3:
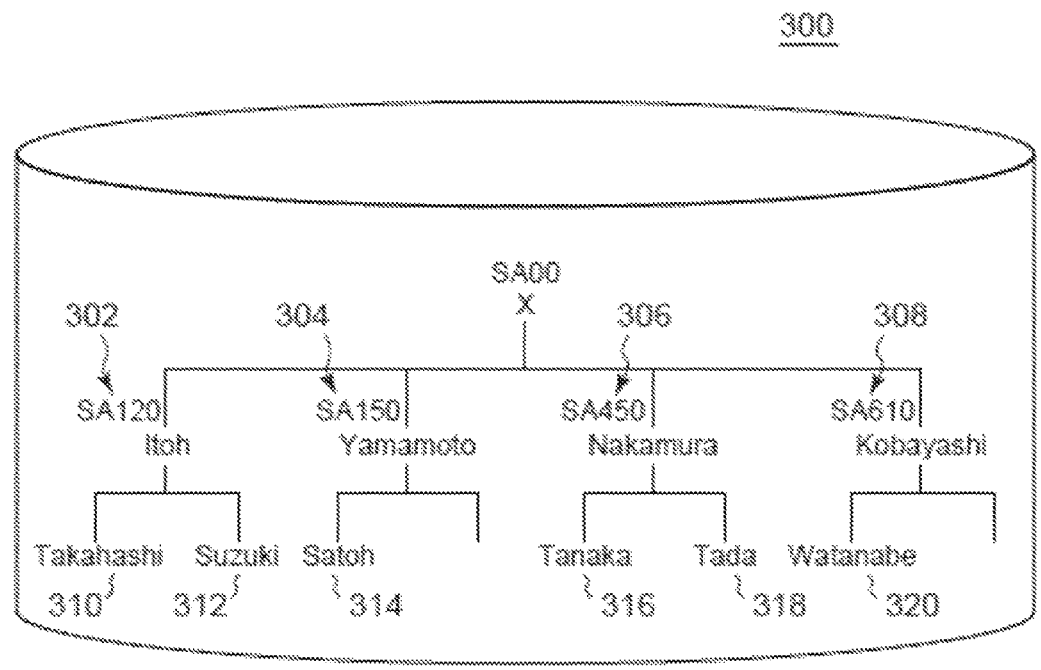
FIG. 3 is a conceptual configuration diagram of the degree-of-association database.

The degree-of-association acquiring portion 206 calculates the degree of association between the destination address selected by the destination address collecting portion 204 and each of the other destination addresses. Unless otherwise designated from the mail editing unit 402, the degree-of-association acquiring portion 206 refers to a predetermined external database, which may be for example a degree-of-association database 300 (FIG. 3) as will be described later, to thereby acquire the degrees of association. Referring to FIG. 3, if the selected destination address is of "Tada" and the other destination address is of "Tanaka", both of them are addresses of subordinates of "Nakamura", and thus, the distance therebetween is calculated as "2". The distance between the destination address of "Nakamura" and the destination address of "Tada" is "1". A smaller distance means a higher degree of association.

The degree-of-association acquiring portion 206 transmits the acquired degrees of association, the mail received from the destination address collecting portion 204, and the destination address selected by the destination address collecting portion 204, to the display attribute modifying portion 208. The display attribute modifying portion 208 modifies the attributes of the contents included in the mail and corresponding to the respective destination addresses, on the basis of the corresponding degrees of association. For example, referring to FIG. 3, if the selected destination address is of "Tada" and the destination addresses of "Nakamura", "Takahashi", and "Tanaka" are also included in the mail, the display attributes of the contents are firstly modified in such a manner that the content for "Tada" is arranged at the top of the mail text.

Next, the content for "Nakamura", having a high degree of association with "Tada", is arranged closest to the content for "Tada". Then, the content for "Tanaka" is arranged second closest thereto, and the content for "Takahashi", which has the smallest degree of association with "Tada", is arranged farthest from the content for "Tada". Alternatively, color or tone may be selected as the display attribute, and the display attributes of the contents may be modified so that the contents are displayed in such a manner that the degrees of association between the content for "Tada" and the contents for the other destination addresses can be recognized therefrom.

The mail with the display attributes of the contents modified in the above-described manner is transmitted, together with the selected destination address, to the mail sending portion 210. The mail sending portion 210 sends the mail to the selected destination address. In the case where the mail receiving portion 202 has received a mail display instruction from the mail editing unit 402, the mail sending portion 210 returns the mail to the mail editing unit 402.

<Degree-of-Association Database 300>

FIG. 3 is a conceptual configuration diagram of the degree-of-association database 300. The degree-of-association database 300 may store a tree structure which corresponds, e.g., to a company organization chart (also referred to as a "report-to chain"). The tree structure includes nodes storing the departments to which staff members belong, 302, 304, 306, and 308, and the staff members' names and destination mail addresses, 310, 312, 314, 316, 318, and 320. The database is configured such that the information may be accessed and searched from the outside. The degrees of association between the destination addresses may be acquired on the basis of the distances between the corresponding nodes in the database, as described above.

<Mail Editing Unit 402>

The mail editing unit 402 (FIG. 4) edits a mail in accordance with an input by a user. The mail editing includes an input of a destination address, an input of a content for the destination address, and others. While the mail editing unit 402 is generally implemented by mailer software that is installed in a personal computer, in the present embodiment, some of the functions have been extended. The details of the extended functions will become apparent in "D. Operation Outline" below.

D. Operation Outline

The operations of each unit have been described above in detail. The overall cooperative operations of the units will now be overviewed with reference to FIGS. 4 to 22.

Figure 4:
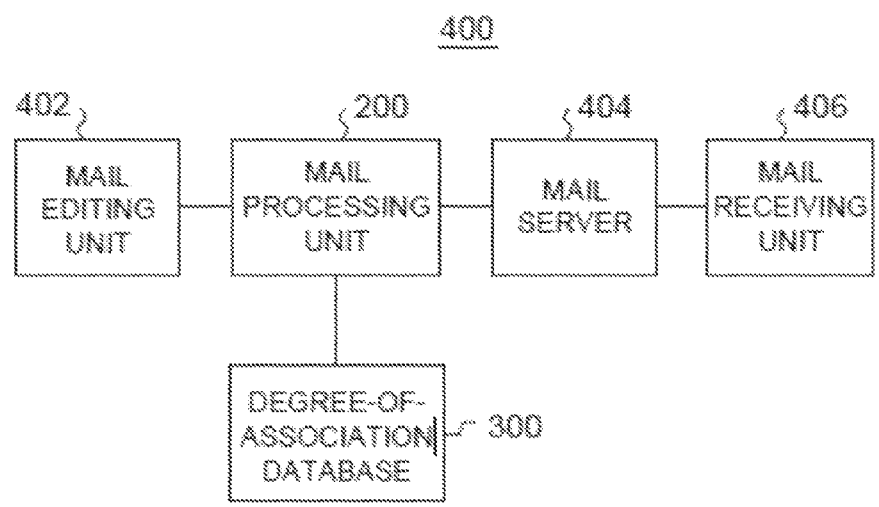
FIG. 4 is a block configuration diagram of an illustrative network system to which the mail processing method according to the present invention is applicable.

FIG. 4 is a block configuration diagram of an illustrative network system 400 to which the mail processing method of the present invention is applicable. The network system 400 includes the mail editing unit 402, the mail processing unit 200, the degree-of-association database 300, a mail server 404, and a mail receiving unit 406.

The mail server 404 receives a mail from the mail processing unit 200, and sends the mail to a designated destination address.

The mail receiving unit 406 is generally implemented by a personal computer to which mailer software has been installed. The mail receiving unit 406 sends/receives a mail to/from the mail server 404, displays a received mail, and edits a new mail.

Figure 5:
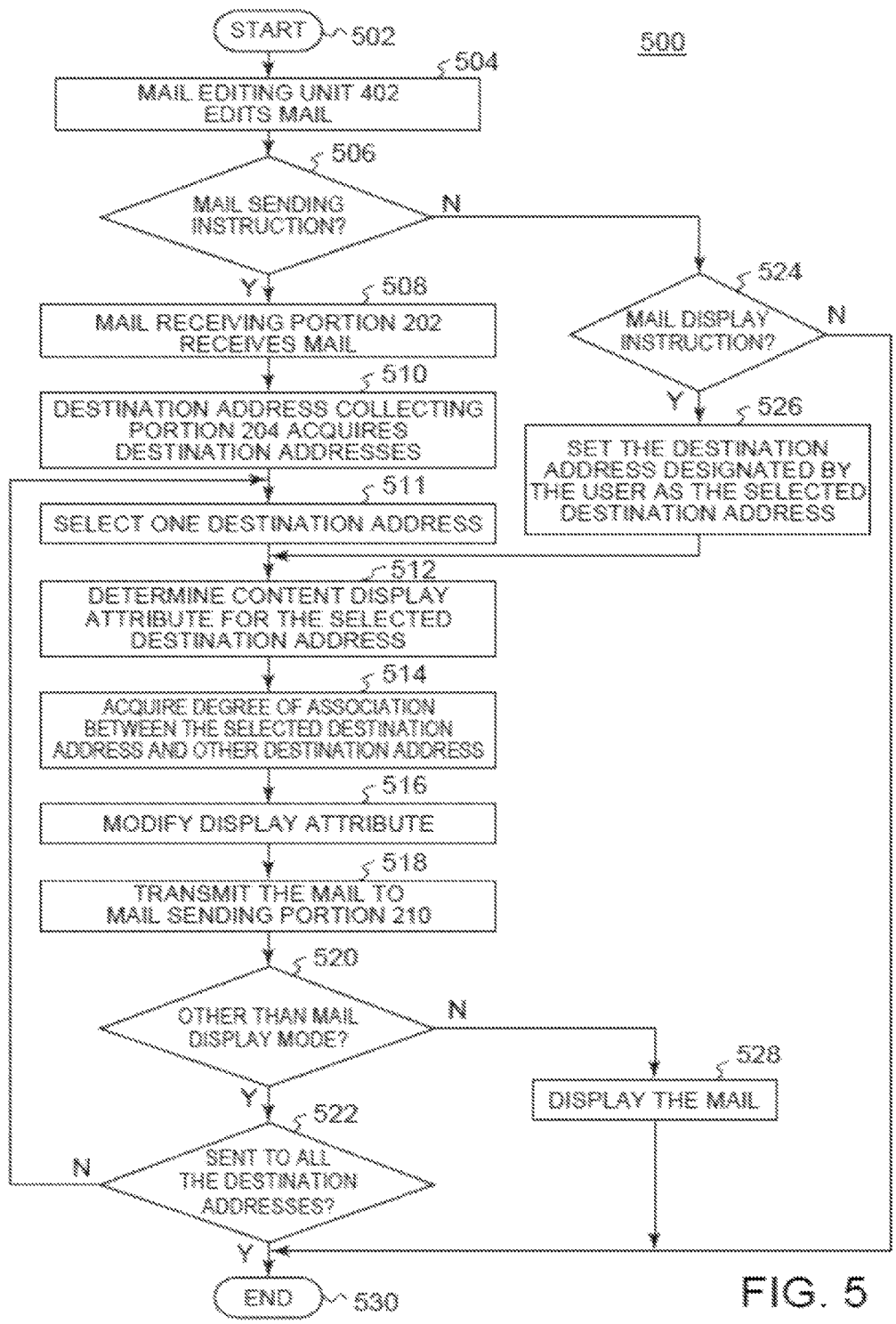
FIG. 5 is a flowchart illustrating cooperative operations of the units included in the network system.

FIG. 5 is a flowchart illustrating the cooperative operations of the units in the network system 400. Firstly, the mail editing unit 402 edits a mail in accordance with an input from a user (step 504). The mail editing will be described later in detail. Next, the mail editing unit 402, in accordance with a mail sending operation by the user, transmits the edited mail to the mail processing unit 200 (step 506).

Additionally, in the case of sending the mail to the mail server 404, the mail editing unit 402 transmits a mail sending instruction to the mail processing unit 200. If the mail sending instruction is received ("Y" in step 506), the mail receiving portion 202 receives the mail (step 508), and transmits the same to the destination address collecting portion 204 (step 510). The destination address collecting portion 204 firstly selects one destination address (step 511). Hereinafter, this selected destination address becomes a destination of the mail. It is preferable that a predetermined display attribute is added to the content corresponding to the selected destination address (step 512). For example, the content may be displayed at the top of the mail text, or may be displayed in a designated color.

Then, the destination address collecting portion 204 accesses the degree-of-association database 300 so as to acquire the degree of association between the selected destination address and each of the other destination addresses included in the mail (step 514). The obtained degrees of association and the mail are transmitted to the display attribute modifying portion 208. The display attribute modifying portion 208 modifies the display attributes of the contents in the mail (step 516). The modified mail is transmitted to the mail sending portion 210 together with the selected address. The mail sending portion 210 sends the mail to the mail server 404 (step 518). The mail server 404 sends the mail to the mail receiving unit 406 at the destination address.

In the case where no mail display instruction has been transmitted from the mail editing unit 402 to the mail processing unit 200 ("Y" in step 520), and if the mail has not been sent to all the destination addresses yet ("N" in step 522), another destination address is newly selected (step 511), and for the mail addressed to the new destination address, the contents are modified in accordance with the degrees of association of that destination address with the other addresses (steps 514 to 518), and the resultant mail is sent to the newly selected destination address. In this manner, a mail is created for each of all the destination addresses, and the display attributes of the contents in each mail are modified as required. When the mails have been sent to all the destination addresses ("Y" in step 522), the process is terminated (step 530).

On the other hand, in the case where the mail editing unit 402 has transmitted a mail display instruction to the mail processing unit 200 ("Y" in step 524), the mail receiving portion 202 receives the destination address selected by the user of the mail editing unit 402, together with the mail (step 526). Then, the degree of association between the selected address and each of the other addresses is acquired (step 514), and the display attributes of the contents in the mail are modified in accordance with the degrees of association (step 518). Next, the mail sending portion 210 returns the modified mail to the mail editing unit 402, so that the mail is displayed on the display device in the mail editing unit 402 (step 528).

The cooperative operations of the units have been described above. Hereinafter, the operations of the units will be described by focusing on the user interface.

First Example

Figure 6:
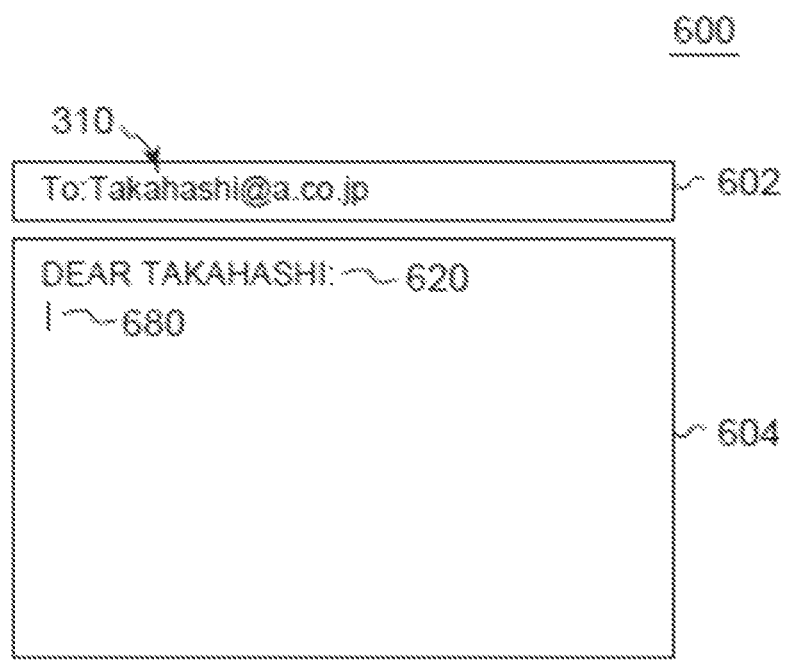
FIGS. 6 to 10 are schematic diagrams each showing a screen displayed on a display device in the mail editing unit.
Figure 7:
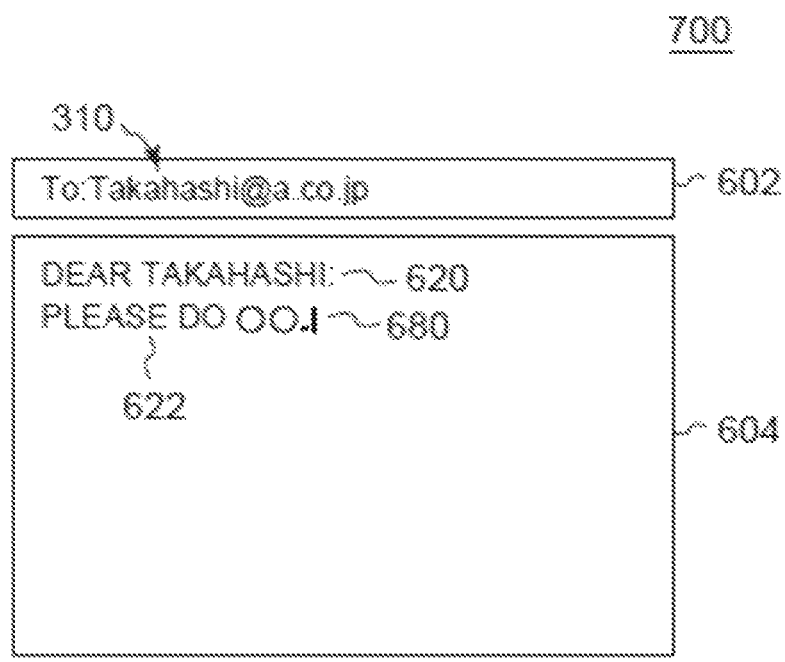

FIGS. 6 to 10 are schematic diagrams each showing a screen displayed on a display device in the mail editing unit 402. When a user inputs a destination address 310 into a destination address box 602, the mail editing unit 402 displays a content box 604 and, in the content box 604, a name 620 corresponding to the destination address and a text input cursor 680 (FIG. 6). For acquiring the correspondence between the mail address 310 and the name 620, the mail editing unit 402 may access the degree-of-association database 300. The user may input into the content box 604 a message 622 for the destination address 310 (FIG. 7).

Figure 8:
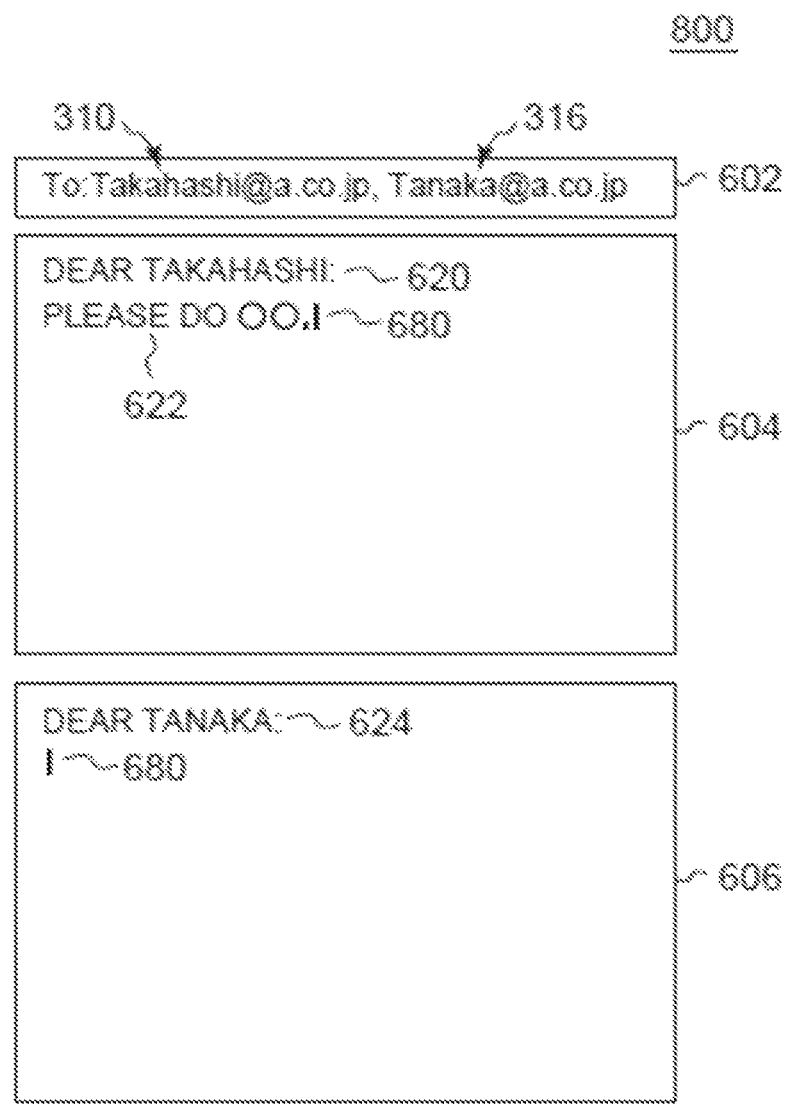
Figure 9:
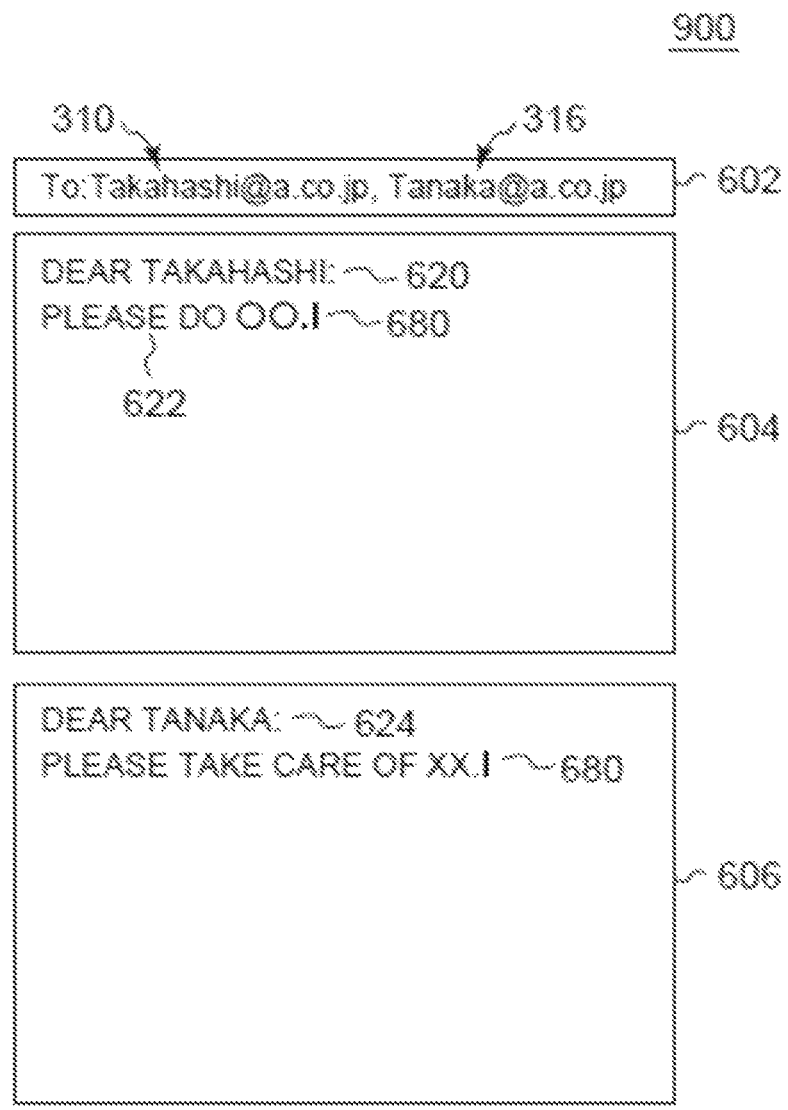

When the user inputs another destination address 316 into the destination address box 602, the mail editing unit 402 displays a new content box 606 (FIG. 8). The user may input into the new content box 606 a message for the other destination address 316 (FIG. 9). The user repeats the above operations so as to input messages for the different destination addresses into the corresponding content boxes 604, 606, 608, and 610 (FIG. 10).

The user may also input a mail subject into a subject box 603. It is noted that the mail editing unit 402 may display destination display boxes 612, 614, 616, and 618 so as to allow the user to discriminate which content box corresponds to which destination address (FIG. 10). In the case where this mail is sent from the mail editing unit 402 via the mail processing unit 200 and the mail server 404 to the mail receiving unit 406, the display attributes of the contents (in the present example, the display locations thereof) are modified by the mail processing unit 200 in accordance with the degrees of association between the destination addresses, as described above.

Figures 10, 11:
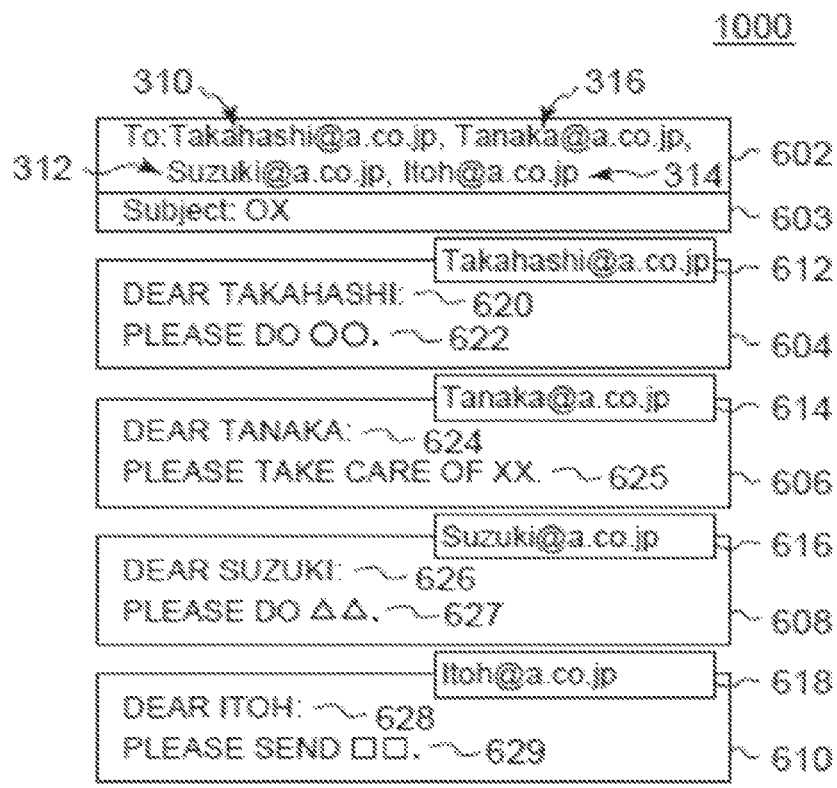
FIG. 11 is a schematic diagram of a screen displayed on a display device in the mail receiving unit.

FIG. 11 is a schematic diagram of a screen displayed on a display device in the mail receiving unit 406. It is here assumed that the mail receiver is "Itoh". Through the process in step 511 in FIG. 5, the contents 628 and 629 addressed to "Itoh" are displayed at the top of the mail text. As the distance from "Itoh" to "Takahashi" and the distance from "Itoh" to "Suzuki" are both "1" and the distance from "Itoh" to "Tanaka" is "4" (FIG. 3), the remaining contents in the mail text are displayed in accordance with the degrees of association with the address of "Itoh", i.e., the contents addressed to "Takahashi", "Suzuki", and "Tanaka" are displayed in this order.

Second Example

FIG. 12 is a schematic diagram of another screen displayed on the display device in the mail receiving unit 406. In this example, the degrees of association between the mail receiver and the other addressees are displayed as a difference in display manner of the contents. More specifically, the contents 628 and 629 addressed to the receiver "Itoh" are displayed in the boldest letters. The contents 620, 622, 626, and 627 addressed to "Takahashi" and "Suzuki", whose distance from "Itoh" is "1", are displayed in the second boldest letters. The contents 624 and 625 addressed to "Tanaka", whose distance from "Itoh" is "4", are displayed in normal letters.

Third Example

FIG. 13 is a schematic diagram of a mail including a content addressed to all the addressees, which is displayed on the display device in the mail editing unit 402. In this case, the mail processing unit 200 is extended such that it determines the presence/absence of a content addressed to all the addressees in step 512 (FIG. 5), and if the mail includes such a content, it adds a predetermined display attribute thereto. For example, the mail processing unit 200 may modify the display attribute of that content so that the content is displayed at the top of the mail text.

In the example shown in FIG. 13, when the user of the mail editing unit 402 selects a "Notify ALL" menu (not shown), a content box 660 is displayed in which a message to be sent to all the destination addresses may be input. The user inputs a message 692 into the content box 660. In a destination display box 696, an asterisk may be displayed so as to allow a user to discriminate the "Notify ALL" message. Furthermore, the user may input messages 650, 652, 654, and 656 addressed to "Suzuki" and "Tanaka", for example.

The mail processing unit 200 is further extended such that it determines the presence/absence of reference information in step 512 (FIG. 5), and if the mail includes such information, it adds a predetermined display attribute thereto. For example, the mail processing unit 200 may modify the display attribute of the content so that the content is displayed at the bottom of the mail text. Here, the reference information refers to a message which is sent to all the destination addresses but whose degree of importance is low. For inputting the reference information, the user may select a "For Your Information" menu (not shown) in the mail editing unit 402. A destination display box 697 corresponding thereto may be left blank.

FIG. 14 is a schematic diagram of a mail including a content addressed to all the addressees, which is displayed on the display device in the mail receiving unit 406. It is here assumed that "Itoh" receives the mail. Firstly, the contents 690 and 692 input via the "Notify ALL" menu are displayed at the top in the mail. Below them, as the mail includes no content for the receiver "Itoh", the contents 650 and 652 addressed to "Suzuki" and the contents 654 and 656 addressed to "Tanaka" are displayed in this order, in accordance with their distances from "Itoh", and the contents 694 and 695 input via the "For Your Information" menu are displayed at the bottom.

Fourth Example

Figure 15:
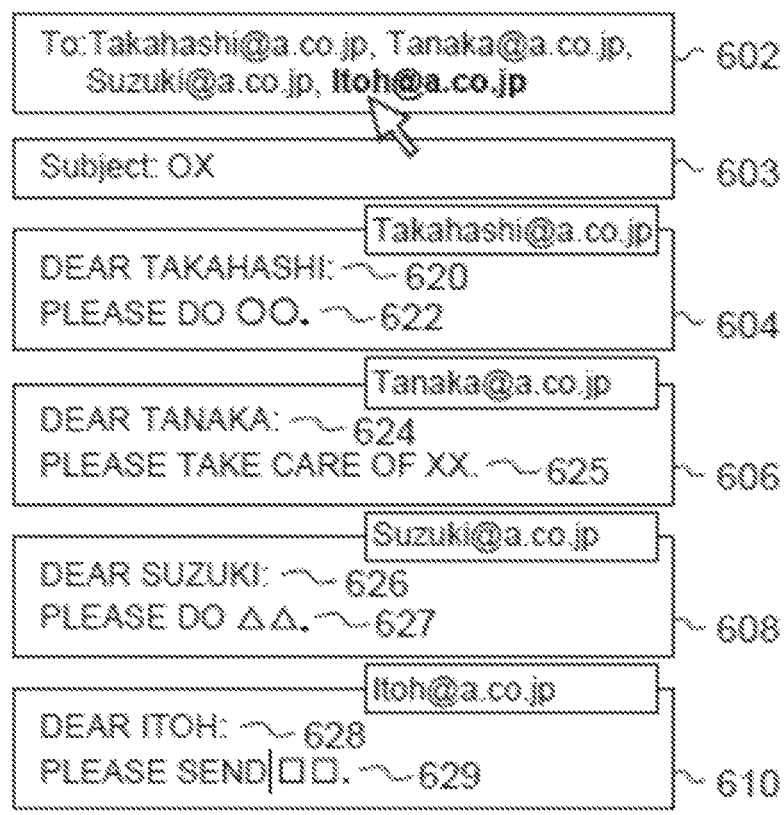
FIG. 15 is a schematic diagram of another mail, which is displayed on the display device in the mail editing unit.

FIG. 15 is a schematic diagram of another mail which is displayed on the display screen in the mail editing unit 402. As described above, a user of the mail editing unit 402 inputs destination addresses of "Takahashi", "Tanaka", "Suzuki", and "Itoh" into the destination address box 602, and messages into the corresponding content boxes 604, 606, 608, and 610.

Thereafter, when the user selects the address of "Itoh" in the destination address box 602, the mail editing unit 402 and the mail processing unit 200 work together so that the process proceeds through steps 524, 526, 520, and 528 in FIG. 5, whereby a preview (FIG. 11) of the mail is displayed on the display screen in the mail editing unit 402. The preview shows how the mail will be displayed on the display device at the mail receiver side when the mail being edited by the mail editing unit 402 is sent to the destination address selected by the user.

Fifth Example

FIG. 16 is a schematic diagram of yet another mail which is displayed on the display device in the mail editing unit 402. In this example, a user may input in the mail editing unit 402 a content 1608 that is simultaneously addressed to a plurality of destination addresses. To input the content 1608, the user may use a mouse to select a plurality of destination addresses from within the destination address box 602, and right click the mouse to select a "multiple destination content" menu, for example.

In this case, the content box 610 is associated with the destination addresses of "Itoh" and "Takahashi".

FIG. 17 is a schematic diagram of a mail which corresponds to the mail shown in FIG. 16 and which is displayed on the display device in the mail receiving unit 406. It is here assumed that "Itoh" receives this mail in the mail receiving unit 406. As described above, the content 1602 addressed to "Itoh" is displayed at the top. Here, the mail processing unit 200 is extended such that, in the process step 512, it adds predetermined display attributes to any contents associated with the selected destination address. For example, the content 1608 including "Itoh" as one of its destinations may be given the second priority so that it is displayed next to the content 1602 addressed solely to "Itoh".

Sixth Example

FIG. 18 is a schematic diagram of a mail including a table, which is displayed on the display device in the mail editing unit 402. This mail includes a table 1820 besides a text 1808. In this example, the mail processing unit 200 is extended such that, in step 514 (FIG. 5), it modifies display attributes for sub-contents (i.e. rows in the table) included in the content 1820, on the basis of the distance from the destination address of the mail to each of the destination addresses included in the content 1820.

A mail sender "IT Security" may send the mail while designating a "department" column 1802, so as to explicitly instruct the mail processing unit 200 to refer to the organization chart in the degree-of-association database 300 when modifying the display attributes of the contents. FIG. 19 is a schematic diagram of the mail including the table, which is displayed on the display device in the mail receiving unit 406. It is here assumed that "Nakamura" receives the mail. The distance from "Nakamura" to "Tanaka" and the distance from "Nakamura" to "Tada" are each "1", meaning that the degree of association between their destination addresses is high. Therefore, the display attributes of the rows corresponding to "Tanaka" and "Tada" are modified such that these rows are displayed at the upper part in the table.

Seventh Example

FIG. 20 is a schematic diagram of a mail displayed on the display device in the mail receiving unit 406 in the case where the mail shown in FIG. 19 is forwarded. It is here assumed that "Nakamura" has forwarded the mail shown in FIG. 19 to his subordinates "Tanaka" and "Tada", and "Tada" has received the mail. In this mail, the display attributes of the contents (in this case, their locations in the table) have been modified by the extended mail processing unit 200 such that the content addressed to "Tanaka", whose distance from "Tada" is "2", is displayed next to the content addressed to "Tada".

Eighth Example

FIG. 21 is a schematic diagram of a mail including another table, which is displayed on the display device in the mail editing unit 402. In this example, a "department head" field has been added. The mail sender "IT Security" may designate one or more columns the information included in which should be given higher priorities by the mail processing unit 200 when it modifies the display attributes for the contents. FIG. 22 is a schematic diagram of a priority setting menu 2200, which is displayed on the display device in the mail editing unit 402. In this example, it is designated such that the top priority is given to "department head" and the second priority is given to "person in charge".

When a user designates as described above and then selects a mail "send" button 2202, the mail is transmitted to the mail processing unit 200. The mail processing unit 200 is extended such that, in steps 510 through 522, it acquires from the degree-of-association database 300 the distance from the destination address to each of the other addresses, and also the distance from the destination address to each of the department head names, in accordance with the designated priority order, so as to modify the display attributes for the contents.

In the present example, the top priority is given to "department head", and thus, the mail processing unit 200 firstly obtains the degree of association between the destination address and each of the department heads on the basis of the corresponding distances, and modifies the display attributes (in this case, the order of appearance in the table) for the contents corresponding to the department heads. Then, as the second priority is given to "person in charge", the mail processing unit 200 obtains the degree of association between the mail destination address and each of the destination addresses of the persons in charge, and further modifies the display attributes for the contents. It is noted that the mail processing unit 200 may further be extended such that, even in the case where the names of the department heads in the "department head" field have been expressed in a different display format, such as Kanji Characters, it can search the degree-of-association database to thereby acquire the above-described degrees of association.

Ninth Example

It may be configured such that the mail processing unit intervenes between the mail server 404 and the mail receiving unit 406, in which case the display attributes of the mail transmitted from the mail editing unit 402 may be modified on the mail receiver side.

The following is a description of reference numerals. 200: mail processing unit; 202: mail receiving portion; 204: destination address collecting portion; 206: degree-of-association acquiring portion; 208: display attribute modifying portion; 210: mail sending portion; 300: degree-of-association database; 402: mail editing unit; and 406: mail receiving unit.

What is claimed is:

1. A computer implemented method for processing e-mail, the method comprising steps of:
   editing an email in a mail editing unit in accordance with input by an user, said email comprising at least three destination addresses wherein each of the at least three destination addresses is a recipient address corresponding to a different recipient, a plurality of contents wherein each of the contents corresponds respectively to one of the at least three destination addresses, and a plurality of display attributes of the contents;
   acquiring, by an address collecting portion of a mail processing unit, a degree of association from a degree of association database between each pair of destination addresses among the at least three destination addresses, wherein the mail processing unit receives the email from the mail editing unit, said degree of association (1) reflecting personal relationships between users corresponding to the each pair of destination addresses, and (2) comparing associations between a first pair of destination addresses and a second pair of destination addresses;
   modifying, by the mail processing unit, the display attributes for the contents in accordance with the degree of association including providing separate content boxes for each of the contents corresponding respectively to one of the at least three destination addresses;
   sending, to each of the at least three destination addresses, the modified email received from the mail processing unit to the mail receiving unit via a mail server; and
   displaying the email received from the mail receiving unit on display screens for each of the different recipients wherein the display attributes enable the email contents to be displayed to differentiate between each of the different recipients in accordance with the degree of association between the each pair of destination addresses among the at least three destination addresses;
   wherein for each of the different recipients, the content box corresponding to the recipient is displayed as most important, and the content boxes corresponding to the other recipients are displayed in the order of importance according to the degree of association between each of the other recipients and the recipient.

2. The method for processing e-mail according to claim 1, wherein the step of acquiring the degree of association includes the steps of accessing a destination address directory unit, the destination address directory unit storing a tree structure having the destination addresses as its nodes, and obtaining the degree of association represented as a reciprocal of on the basis of a distance within the tree structure between the each pair of destination addresses among the at least three destination addresses.

3. The method for processing e-mail according to claim 2, wherein the tree structure is configured on a basis of a report-to chain in which individual users corresponding respectively to the at least three destination addresses are included.

4. The method for processing e-mail according to claim 1, wherein the display attribute designates a location of the content on the display screen, and the modifying step includes the step of modifying the display attributes for the contents corresponding to the each pair of destination addresses, in accordance with the degree of association.

5. The method for processing e-mail according to claim 4, wherein the modifying step includes the step of modifying the display attributes in such a manner that, for each of the different recipients, of the contents corresponding respectively to each of the other recipients, the content corresponding to a destination address that is higher in the degree of association with a destination address belonging to the each of the different recipients, is located closer to the content corresponding to the destination address belonging to the each of the different recipients.

6. The method for processing e-mail according to claim 1, wherein the display attributes include at least one of color, brightness, blinking, and decoration of the content on the display device.

7. The method for processing e-mail according to claim 1, further comprising the step of sending the e-mail having its display attributes modified according to each of the different recipients, to each of the different recipients, respectively.

8. The method for processing e-mail according to claim 1, further comprising the step of displaying the e-mail having its display attributes modified, on the display device.

9. The method for processing e-mail according to claim 1, wherein the e-mail further includes a content corresponding to all of the at least three destination addresses, the content being displayed in a predetermined location on the display device irrespective of the degree of association.

10. A non-transitory computer readable storage medium having computer readable program code embodied therewith, the computer readable program code comprising:
computer readable program code configured to edit an email, said email comprising at least three destination addresses wherein each of the at least three destination addresses is a recipient address corresponding to a different recipient, a plurality of different contents wherein each of the contents corresponds respectively to one of the at least three destination addresses or recipients, and a plurality of display attributes of the contents;
computer readable program code configured to acquire a degree of association between each pair of destination addresses among the at least three destination addresses, said degree of association (1) reflecting personal relationships between users corresponding to the each pair of destination addresses, and (2) comparing associations between a first pair of destination addresses and a second pair of destination addresses; and
computer readable program code configured to modify the display attributes for the contents in accordance with the degree of association, including providing separate content boxes for each of the contents corresponding respectively to one of the at least three destination addresses, wherein when the modified email is sent to each different recipient the display attributes enable the email contents to be displayed to differentiate between each of the different recipients in accordance with the degree of association between the each pair of destination addresses among the at least three destination addresses;
wherein for each of the different recipients, the content box corresponding to the recipient is displayed as most important, and the content boxes corresponding to the other recipients are displayed in the order of importance according to the degree of association between each of the other recipients and the recipient.

11. A system for processing e-mail, the system comprising:
a mail editing unit for editing the email in accordance with an input from an user, said email comprising at least three destination addresses wherein each of the at least three destination addresses is a recipient address corresponding to a different recipient, a plurality of different contents wherein each of the contents corresponds respectively to one of the at least three destination addresses, and a plurality of display attributes of the contents;
a degree of association database for storing a degree of association between each pair of destination addresses among the at least three destination addresses included in the email, said degree of association (1) reflecting personal relationships between users corresponding to the each pair of destination addresses, and (2) comparing associations between a first pair of destination addresses and a second pair of destination addresses;
a mail processing unit receiving the edited email from the mail editing unit, the mail processing unit comprising an address collecting portion and a display attribute modifying portion, the address collecting portion acquiring the degree of association from the degree of association database and, the display attribute modifying portion modifying the display attributes for the contents in accordance with the acquired degree of association including providing separate content boxes for each of the contents corresponding respectively to one of the at least three destination addresses;
a mail server receiving the email from the mail processing unit and forwarding the email to each of the at least three destination addresses; and
a mail receiving unit receiving the email from the mail server and displaying the email on a separate display device for each different recipient, the display attributes enable the email contents to be displayed to differentiate between each of the different recipients in accordance with the degree of association between the each pair of destination addresses among the at least three destination addresses;
wherein for each of the different recipients, the content box corresponding to the recipient is displayed as most important, and the content boxes corresponding to the other recipients are displayed in the order of importance according to the degree of association between each of the other recipients and the recipient.

12. The method of claim 1 wherein the degree of association is defined in accordance with users' interests of each of the different contents.

* * * * *